April 2, 1963  J. W. HENLEY  3,084,004
ELASTOMERIC BEARING RACES
Filed Oct. 14, 1960

INVENTOR.
JOHN W. HENLEY
BY
Oberlin, Maky & Donnelly
ATTORNEYS

United States Patent Office 3,084,004
Patented Apr. 2, 1963

3,084,004
ELASTOMERIC BEARING RACES
John W. Henley, Willoughby, Ohio, assignor to The Eagle-Picher Company, Cincinnati, Ohio, a corporation of Ohio
Filed Oct. 14, 1960, Ser. No. 62,684
4 Claims. (Cl. 308—187.2)

The present invention relates to an improved bearing assembly having a race composed of an elastomeric material such as a cross-linked polyurethane and especially such a race including a lubricant to reduce its coefficient of friction.

Bearing races composed entirely of metal are objectionable for certain applications in that they easily transmit noise, chatter, and vibration. For example, noise and vibration of an automobile are readily transmitted through metallic bearings of a steering column. Moreover, due to the inherent nature of metal, metallic races of bearings rigidly resist any force tending to deform them.

In accordance with the present invention, elastomeric races are provided which acoustically insulate to an appreciable degree the members between which the races are interposed and which are thereby adapted for relative movement. Further, because of their elastic nature, the present races can be slightly deformed, as under light loads, without serious results. For instance, circular bearing races can be forced to a more elliptical shape without affecting operation. As a result, it is possible to increase dimensional tolerance of the members which carry the present bearing races for relative movement with each other, such as shafts, tubular housings, and the like.

It is therefore a principal object of the invention to provide an improved bearing assembly.

Another object is to provide a race for a bearing assembly composed of an elastomeric cross-linked polyurethane.

A further object is to provide a bearing race composed of an elastomeric cross-linked polyurethane having a lubricant to reduce the coefficient of friction thereof.

A still further object is to provide a bearing race composed of an elastomeric cross-linked polyurethane and having an improved structure wherein a race is more readily positioned with respect to a member intended to engage the race.

A still further object is to provide a bearing race composed of an elastomeric cross-linked polyurethane and having sealing flanges to provide a substantially dust-proof bearing assembly.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

Figure 1:
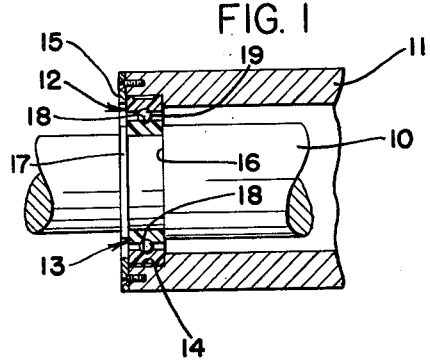
FIGURE 1 is a cross-section of a bearing assembly embodying bearing races of the present invention.

In general, a race for the present bearing assembly is produced by forming a cross-linked polyurethane, preferably having certain physical properties, and then shaping the polyurethane, as by molding, into a desired race configuration.

POLYURETHANE COMPOSITIONS

The term "polyurethane" refers to a class of polymers which may be regarded as a polymer of the ester of carbamic acid in which the repeating unit is a urethane linkage. One method employed for the production of the urethane linkage is the reaction of an isocyanate radical with a compound or radical having a reactive or labile hydrogen atom, such as in hydroxyl and amino radicals, as determined by a positive Zerewitinoff test. Thus, polyurethanes may be generally defined as polymers produced by the addition reaction between organic isocyanates and active hydrogen-containing compounds, such as glycols, polyesters, polyethers, polyols, polyamides, polyamines, phenols, or with compounds containing carboxylic acid, amino, or amido radicals.

When in such a reaction, an organic diisocyanate is used together with a reactant having bi-functional groups, each group having an active hydrogen atom, for example a diol, a polymer is produced having a relatively large molecule. In polymerizing, the active hydrogen atom shifts to the nitrogen atom of the isocyanate radical. The polymer of these reactants is substantially linear or straight-chained and normally exhibits thermoplasticity or heat sensitivity. These properties are thought to result from a linear polyurethane because each of such relatively large straight-chain molecules is not chemically bonded with companion macro-molecules, and therefore the physical relationship of the molecules inter se is not fixed. Freedom of these molecules to move relatively to each other provides the thermoplasticity. Because of such thermoplasticity, the linear polyurethanes are not suitable for use as bearing races where the latter are subjected to substantial stress and strain and where heat, generated for example by friction, may cause a thermoplastic polyurethane to deform or "creep." However, when in such a reaction as initially described, the organic isocyanate or labile hydrogen-containing reactant has more than two functional groups, such as, respectively, in a tri-isocyanate or in glycerol; or if a third bi-functional reactant is included having an active hydrogen atom (such as from a hydroxyl or an amino group) which has become known in the art as a cross-linker; a substantially rigid, apparently thermoset or cured polymer is formed having a three dimensional spatial configuration. The exact mechanism is not clear. It may be that the "cross-linker" merely extends the length of the linear polymer and allophanation between the chains produces the cross-linking. Often such a polymer is further subjected to a "post-cure" operation which completely reacts all isocyanate groups, although there may be some reactive hydrogen atoms remaining. These polyurethanes, because of their three dimensional structure and lack of free isocyanate groups (or nearly so) are tougher, more resistant to wear and heat, are less active chemically and have a greater mechanical strength. Consequently, the cross-linked polyurethanes are particularly contemplated by the present invention for use as bearing races and notably those polyurethanes cross-linked to a degree obtained by post-curing.

The manner of initially preparing a polyurethane, as by polyaddition, is known in the art. Reference is made, for example, to United States Patents No. 2,577,279; No. 2,620,516; No. 2,621,166; No. 2,729,618, and No. 2,764,565 for information on such preparation, such patents being hereby incorporated by reference. For instance, a polyisocyanate and a polyester or polyether, etc., are degassed, then mixed and heated within a range from about room temperature to about 300° F. If a cross-linked polymer is desired, one or both of the reactants should be tri-functional, or a cross-linker of the type hereinafter described may next be added. During the initial reaction, the cross-linked polyurethane exhibits generally thermosetting properties, that is, the polyurethane hardens and to all intents and purposes becomes infusible. This has led to attempts quickly to mold the polyurethane during this reaction and before the material has set which usually is within a very short period of time.

For identification purposes, a compound that contains a free or labile hydrogen atom, and which may be used in producing a polyurethane to be used in accordance with the present invention, may further be described as one that will give a positive Zerewitinoff test. That is, any compound which, when added to a Grignard solution of methyl iodide, liberates methane by decomposition of the Grignard reagent. Thus a polyurethane as herein contemplated includes those reaction products of an organic polyisocyanate with a variety of other multi-functional compounds meeting the indicated test for a free or active hydrogen atom, such as those compounds having hydroxyl, carboxyl, amino, and amido groups.

The organic isocyanates which may be used in preparing the polyurethane include diphenylmethane-4,4'-diisocyanate; 3,3'-dimethyldiphenylmethane-4,4'-diisocyanate; ethylene diisocyanate; ethylidene diisocyanate; propylene-1,2-diisocyanate; butylene-1,4-diisocyanate; hexylene-1,6-diisocyanate; cyclohexylene-1,2-diisocyanate; m-phenylene diisocyanate; p-phenylene diisocyanate; 2,4-toluylene diisocyanate; 1,6-toluylene diisocyanate; 3,3'-dimethyl-4,4'-biphenylene diisocyanate; 3,3'-dimethoxy-4,4'-diphenylene diisocyanate; 3,3'-diphenyl-4,4'-biphenylene diisocyanate; 4,4'-biphenylene diisocyanate; 3,3'-dichloro-4,4'-biphenylene diisocyanate; triphenylmethane triisocyanate; 1,5-naphthalene diisocyanate; hexamethylene diisocyanate; polymethylene polyphenylisocyanate; or polyisocyanates in a blocked or inactive form such as the bis-phenyl carbamates of toluylene diisocyanate, etc. An excess of the polyisocyanate is normally used in preparing a cross-linked polyurethane. Such excess may be in the range of about 0.20 to about 0.22 mol of the polyisocyanate for each mol of the active hydrogen-containing compound.

The compounds most usually reacted with an organic polyisocyanate are the polyesters, such as linear or branched chain polyesters, and/or polyesteramides which contain free hydroxyl groups, and/or polyethers, and/or other groups containing reactive hydrogen atoms such as amino and/or amido groups.

Thus, the useful polyesters and/or polyesteramides may include those obtained by condensing any polybasic (preferably dibasic carboxylic) organic acid, such as adipic, sebacic, phthalic, isophthalic, terphthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, glutaric, pimelic, zuberic, azelic, etc., with polyalcohols such as ethylene glycol, diethylene glycol, pentaglycol, glycerol, sorbitol, triethanolamine, di-($\beta$-hydroxyethyl) ether, etc. and/or amino-alcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines (ethylene diamine, hexamethylene diamine, 3-methylhexamethylene diamine, decamethylene diamine, and m-phenylenediamine, etc.) and/or amino-alcohols, etc. In the esterification, the acid per se may be used for condensation or, where desirable, equivalent components, such as the acid halide or anhydride may be used.

The alkylene glycols and polyoxyalkylene glycols useful in the preparation of polyurethanes may comprise ethylene glycol, propylene glycol, butylene glycol-2,3', butylene glycol-1,3; 2-methyl pentanediol-2,4' 2-ethylhexanediol-1,3' hexamethylene glycol, styrene glycol, and decamethylene glycol, etc., and diethylene glycol, triethylene glycol, tetraethylene glycol, polyethylene glycols, dipropylene glycol, tripropylene glycol, polypropylene glycols.

Broadly, any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed in preparing polyurethanes. Moreover, any organic compound containing at least two radicals selected from the class consisting of hydroxyl and carboxyl groups may be so employed. Mixed esters may also be used, such as the mixed ester of ethylene glycol and 1,2-propylene glycol with adipic acid; the mixed ester of ethylene glycol and 2,3-butylene glycol with adipic acid; and the mixed ester of ethylene glycol and diethylene glycol with adipic acid.

Good results have been obtained using either a polyester resin or a polyether resin as the active hydrogen-containing compound for reaction with a polyisocyanate. In general, polyesters are preferred for bearing races for use at relatively high temperatures, for example, above about 50° F.; and polyethers are preferred for the preparation of polyurethane races intended for relatively low temperature use, particularly the temperatures below 32° F.

The polyesters used, are generally liquids of moderate molecular weight, for example 600 to 2600, and terminate principally in hydroxyl groups. The polyesters vary in their degree of branching. Linear polyesters usually lead to elastic polyurethanes and are therefore employed where more resilient products are desired, whereas the highly branched polyesters produce more rigid polyurethanes.

Where a cross-linker is used, as in preparing a three dimensional cross-linked, cured polyurethane, this reactant may include polyalcohols, such as butane diol, ethylene glycol, propylene glycol, butylene glycol, diethylene glycol, triethylene glycol, glycerol, trimethylol propane, hydroquinone, and the like. Aromatic cross-linkers such as 1,4 di-(hydroxyethyl) benzene and hydroquinone may also be used. Non-tertiary amines, such as those described in the previously mentioned U.S. patents, because of their active hydrogen atoms can also serve as cross-linkers. Water is also a cross-linker although due to the resulting evolution of carbon dioxide gas, water is usually employed when a cellular polyurethane is desired.

The urethane reaction may be promoted by an accelerator or catalyst, although polyurethanes have been formed without the use of any accelerator. Tertiary amines having no active hydrogen atom cannot add to the isocyanate group but do make good catalysts. The base strength of a particular tertiary amine is not necessarily the sole criterion for catalytic activity since steric effects are also important. Among the catalysts or accelerators which can be used are alcohols, amino, and diamino compounds. Examples include 1,4 butane diol, N-methyl morpholine, dimethyl ethanolamine, triethylamine, N,N'-diethylcyclohexylamine, N,N'-dimethylcyclohexylamine, dimethylhexahydroaniline, diethylhexahydroaniline, and cobalt naphthenate. The amount of catalysts used does not appear to be critical; from 3 to 20 parts by weight of the catalyst per 100 parts by weight of a polyester resin have been used although quantities outside of this range are also effective.

After the polyurethane is prepared, it may be shaped to the form of a race by standard techniques including casting and molding operations. This practice may be followed in the case of cross-linked polyurethanes and even with completely reacted cross-linked polyurethanes, that is, polyurethanes cross-linked to a degree obtained by post-curing. As herein used, the term "post-curing" means so treating the cross-linked polyurethane that there are substantially no free isocyanate groups. For example, post-curing can be carried out by heating the polyurethane within the range of about 100° C. to about 130° C. for about 15 to about 80 hours.

As described and claimed in prior copending applications: Serial No. 723,949, now abandoned, Serial No. 785,228, Serial No. 814,302, and Serial No. 25,053, all having a common assignee, completely cured cross-linked polyurethanes have been previously regarded as thermosetting and incapable of acquiring thermoplastic properties. Such applications are hereby incorporated by reference. However, it has now been discovered that even cross-linked polyurethanes, post-cured as described, have latent thermoplastic properties when sufficiently heated and can be extruded, injection molded, and the like without undue haste, that is, without a danger of the polymer becoming infusible as is the case with thermosetting resins. Advantage is taken of this previously unkown attribute of post-cured polyurethanes in using them as well to form the present bearing races.

For example, in practice the initial reaction may be treated as a molding step or the material may be merely cast as a slab in order to provide a practical manner of physically obtaining the polyurethane. Or if desired, the material may be allowed to "thermoset" within the reaction kettle. The material may be subsequently post-cured in an oven at about 110° C. for about 24 hours to complete the initial reaction although this is not necessary.

Following the post-curing, the cross-linked polyurethane is again heated at a temperature above the original or first molding temperature, whereupon the material has surprisingly been found to behave as though thermoplastic. The lowest or initial temperature at which thermoplasticity begins varies for different polyurethanes but can easily be determined by simple trial and error. However, for most polyurethanes thermoplasticity can be realized above 300° F. and generally within the range of about 300° F. to about 500° F.

While the polyurethane material is thus in a flowable state, as contrasted with the sticky, "chewing gum" consistency of rubber when it is heated to a melting or flow point, the polyurethane is formed into the shape of a race and allowed to cool.

If the polyurethane is to be injection molded, following either the initial reaction or the post-curing operation, the "thermoset" polyurethane material may be converted to a granular or pelletized form. The granules or pellets are then fed to known plastic molding machines wherein the polyurethanes are heated to thermoplasticity and then molded as desired. For instance, the polyurethane can be injection molded in a Van Dorn machine at a temperature within the range of about 325° F. to about 400° F. Instead of injection molding, a bearing race can be cast from a polyurethane melt directly into a suitable mold, particularly where a relatively large bearing is to be produced.

Preferably, for best results as a bearing race, the polyurethane should have the following physical properties: a Shore D durometer of about 40 to about 75; a maximum compression set of about 25 percent; and a resiliency providing a recovery of about 35 percent to about 75 percent. The elongation range of the polyurethane should preferably be from about 100 percent to about 600 percent.

Here and in the claims, by "compression set" is meant that value obtained by the ASTM test D395-55 Method A, using a 1500 pound load for 22 hours at 158° F. Here and in the claims, by a resiliency having a defined "recovery" is meant that value obtained by the ASTM test D945-59 (Yerzley Resiliency Test).

LUBRICANTS

In order to reduce the coefficient of friction of an elastomeric polyurethane race, particularly where one race makes sliding contact with another as in the embodiment of FIGURE 5 hereinafter more fully described, it is advantageous to use a lubricant with the polyurethane. A lubricant is more effective in the medium-to-soft polyurethanes of the indicated hardness range. A lubricant may be either incorporated within the polyurethane prior to forming the race, or a lubricant may be applied to the surface of the race after it is formed.

Among those lubricants which may be incorporated within the polyurethane are powdered graphite and a metal disulfide selected from the group consisting of tungsten disulfide and molybdenum disulfide in admixture with a liquid silicone oil. Here and in the claims, by "liquid silicone oil" is meant a monomer or polymer which is still liquid and has the unit formula $RR'SiO$, wherein either R or R' is alkyl, such as methyl, ethyl, or propyl; or aryl, such as penyl or tolyl, etc. An example is a dimethyl silicone oil sold by General Electrc under the designation GE-96-100.

The graphite or metal disulfide-silicone oil mixture are admixed with the active hydrogen-containing compound, such as a polyester or polyether resin, and preferably prior to the addition of a cross-linker. The process is otherwise the same, with the result that such a lubricant becomes dispersed throughout the body of the resulting polyurethane. In operation, particularly with the metal disulfide-silicone oil mixture, the lubricant tends to exude to the surface of the race continuously to supply the desired lubricity.

Powdered graphite may be used in an amount of about 1 to about 30 parts by weight per 100 parts by weight of the hydrogen-containing compound. The disulfide-silicone oil mixture, which furnishes a combined "wet-dry" lubricant, may be used in an amount of about 0.5 to about 2 parts by weight per 100 parts of the hydrogen-containing compound. The mixture itself may comprise about one part by weight of the metal disulfide with about 0.5 to about 3 parts by weight of the liquid silicone oil.

Alternatively, the polyurethane race can be coated with a lubricant. For example, polytetrafluoroethylene (Teflon) may be so applied by spraying, dipping, or brushing a dispersion of polytetrafluoroethylene particles in an organic vehicle and binder to produce a thin film on the surface of the race. The organic vehicle may include any organic liquid capable of dissolving the indicated components, such as amyl acetate. The binder, where used, may comprise a sufficient amount of a resin, such as phenol-formaldehyde or epoxy resins, to produce the desired binding action. Repeated coatings may be used if necessary, although a layer of polytetrafluoroethylene of about 1 to about 3 mils in thickness usually suffices.

SPECIFIC STRUCTURES

Figure 2:
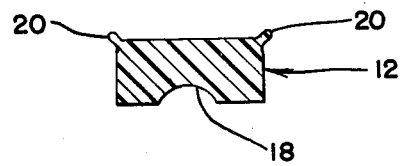
FIGURE 2 is an enlarged cross-sectional view of the outer race illustrated in FIGURE 1 and shows circumferentially extending lips which aid in positioning the race.

The embodiment of FIGURES 1 and 2 includes a shaft 10 and telescoping tube 11 which are adapted for relative rotary motion by elastomeric cross-linked polyurethane bearing races 12 and 13 interposed therebetween. Tube 11 has a recess 14 to receive race 12. A circular lock plate 15, held, for example, by screws to the tube 11, keeps race 12 in place. The shaft 10 has a shoulder 16 against which race 13 abuts. A lock ring 17 fixed with respect to the shaft maintains the race 13 in place. Each race has a groove 18 to receive bearing elements 19. The latter are here illustrated as ball bearings, but it will be apparent that needle bearings, roller bearings, tapered pin bearings, and the like are equally applicable.

As shown in FIGURE 2, race 12 has circumferentially extending lips 20 adjacent the intersections of an outer and side surfaces of the race. Race 13 can be similarly equipped. Due to the elastic nature of the polyurethane, the lips or rims 20 have a unique ability to center or position the race within a recess intended to receive it. For example, the recess 14 of tube 11 or the lock plate 15 first contact the lips 20 during installation of the bearing assembly. This has the effect of flexing the body of the race to aid in moving it to a proper position. Additionally, this action compresses the polyurethane race and serves to provide for dimensional tolerances in that the races need not be made as strictly to specifications as would be the case with a metal race.

Figure 3:
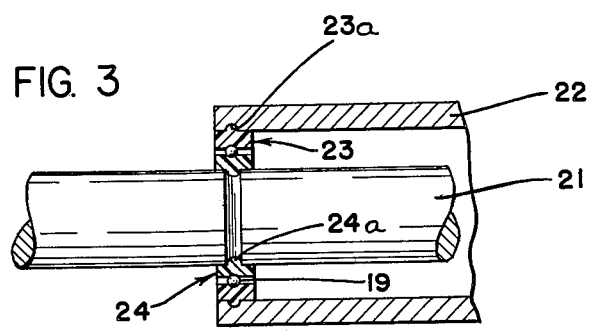
FIGURE 3 is a cross-section of a bearing assembly, similar to FIGURE 1, and illustrates a modified bearing race.
Figure 4:
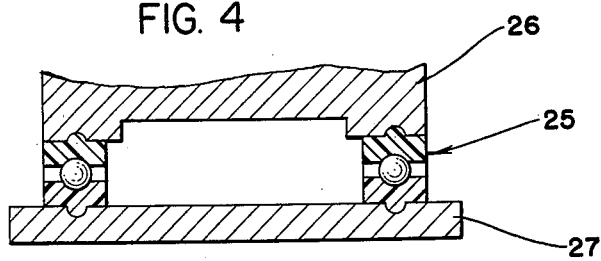
FIGURE 4 is an enlarged cross-section of a bearing assembly and shows the bearing races of FIGURE 3 arranged in a thrust bearing.

In FIGURE 3, a shaft 21 and telescoping tube 22 are adapted for relative movement by polyurethane races 23 and 24 and ball bearings 19 interposed therebetween. In this case, the races have a circumferential positioning projection, such as beads 23a and 24a, respectively, which are received in matching grooves of the tube 22 and shaft 21. The beads help to maintain the races in place. FIGURE 4 illustrates a similar arrangement for a thrust bearing. Here a bearing assembly generally shown at 25 is stationed between members 26 and 27 which are thereby adapted for relative movement with respect to each other. The structure of race 25 is similar to that shown in FIGURE 3.

Figure 5:
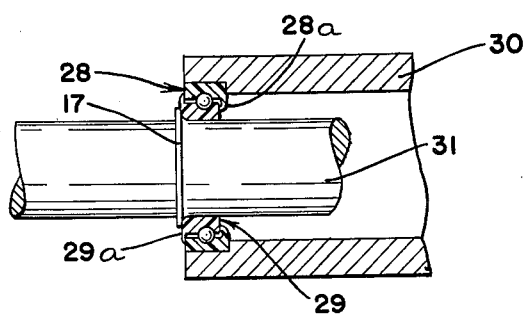
FIGURE 5 is a cross-section of a bearing assembly and illustrates bearing races having sealing flanges to form a substantially dust-proof assembly.

The embodiment of FIGURE 5 is similar to that of FIGURE 1 except that each of the races 28 and 29 has a single marginal flange 28a and 29a, respectively, extending toward and contacting the other side of a companion race for sliding engagement therewith. In this manner, the bearing assembly is sealed against the entry of dust, dirt, and other foreign particles. It will also be noted that since the races 28 and 29 bear laterally against one another through the flanges 28a and 29a, there is a simplicity of structure where light side thrust is encountered. For example, comparing FIGURE 5 with FIGURE 1, the lock plate 15 is eliminated from the tube 30. Also, the shaft 31 of FIGURE 5 need not be recessed. Alternatively, if shaft 31 is recessed to receive race 29, the lock ring 17 can be eliminated. It will be apparent that the various construction features of the embodiments illustrated can be inter-exchanged with one another.

In any of the embodiments, it is not necessary to cement the polyurethane races to the members which receive them. Advantage may be taken of the elastic nature of the polyurethane in acquiring a tight fit. For instance, in FIGURE 1, race 13 may be somewhat undersized with respect to the diameter of shaft 10, and race 12 may be somewhat oversized with respect to the internal diameter of the recess 14 of the tube 11. Even without such over and undersizing of the races, there is a natural tendency for the polyurethane races to resist skidding more along the members which receive them than along the bearing elements because of the greater surface area of contact with the former.

In order to demonstrate the invention, the following example is set forth for the purpose of illustration only. Any specific enumeration or detail mentioned should not be interpreted as a limitation of the invention unless specified as such in one or more of the appended claims and then only in such claim or claims.

*Example*

A linear polyester resin was conventionally formed by reacting about 14 to 15 parts by weight of ethylene glycol with about 13 parts by weight of adipic acid until the reaction product had a hydroxyl number of about 54, indicating a molecular weight of about 2,000. The excess glycol was then removed and the polyester resin was then degassed. A master batch was then prepared consisting of 3 parts of a dimethyl silicone oil (GE-96-100) and 1 part of tungsten disulfide by weight. These ingredients were mixed together and then added to the polyester resin in an amount of about 1 part per 100 parts of the resin by weight.

Diphenylmethane-4,4'-diisocyanate was next added in excess of the ratio of 2 mols of diphenylmethane-4,4'-diisocyanate to 1 mol of the polyester. The mixture was stirred, heated at about 293° F. and further degassed for about 25 minutes after which a cross-linking agent, hydroquinone, was added in molar quantities substantially equal to the number of mols of the polyester. The resulting mixture was then further stirred for about 30 seconds at 260° F. In less than 4 minutes the material had gelled. The reaction product was then post-cured in an oven at 110° C. for 24 hours. After granulating the post-cured polyurethane, the granules were fed to a Van Dorn injection machine. The granules were heated to about 350° F. to a thermoplastic state and then injected into a mold having a cavity forming a bearing race.

Other polyurethanes and lubricants herein disclosed can be processed in the same manner.

Other forms embodying the features of the invention may be employed, change being made as regards the features herein disclosed, provided those stated by any of the following claims or the equivalent of such features be employed.

I therefore particularly point out and distinctly claim as my invention:

1. A bearing assembly including relatively movable telescoping bearing races having bearing elements disposed therebetween, each of said races being molded from a polyurethane plastic and having an integral marginal flange extending toward and contacting the other race for sliding engagement therewith, said flanges being on remote sides of the telescoping races to provide a substantially dust-free sealed bearing assembly and to enable assembling the races in said telescoping relation.

2. A bearing assembly including a pair of relatively movable telescoping one-piece bearing races having bearing elements disposed therebetween, each of said races being molded from a cross-linked elastomeric polyurethane and having a lubricant dispersed therethrough, each race also having a single, integral marginal flange extending toward and laterally of the other race and contacting a side of said other race for sliding engagement therewith, the flanges of the two races being on opposite sides of the telescoping races to provide a substantially dust-free seal on both sides of the bearing assembly and to enable assembling the races in said telescoping relation.

3. A bearing assembly including a pair of relatively movable telescoping one-piece bearing races having bearing elements disposed therebetween, each of said races consisting essentially of a cross-linked polyurethane elastomer having a Shore D durometer in the range of about 40 to about 75, a maximum compression set of about 25 percent, and a resiliency providing a recovery factor of about 35 percent to about 75 percent, each race being axially offset with respect to each other and having a single marginal flange integral at its non-telescoping portion, said flange extending radially of the race toward and laterally of the other race and contacting an axially-disposed side thereof for sliding engagement therewith, the flanges of the two races thus being on opposite sides of the bearing assembly defined by the telescoping races to provide a substantially dust-free seal on both sides of the bearing assembly and to enable assembling the races in said telescoping relation.

4. A bearing assembly including a pair of partially telescoping, one-piece races having bearing elements therebetween for relative rotary movement of the races about a common axis of rotation, each of said races being molded from a cross-linked polyurethane elastomer prepared by reacting a resin selected from the group consisting of a polyester and a polyether with an excess of an organic polyisocyanate needed to react therewith and with a cross-linking agent, said cross-linked polyurethane having a Shore D durometer in the range of about 40 to about 75, a maximum compression set of about 25 percent, and a resiliency providing a recovery factor of about 35 percent to about 75 percent, each race having a single marginal flange integral with its non-telescoping portion and extending radially with respect to said axis of rotation toward and laterally of said other race substantially past said bearing elements and contacting an axially-disposed side of said other race for sliding engagement therewith, the flanges of the two races thus being on opposite sides of the partially telescoping races to provide a substantially dust-free seal on both axially-disposed sides of the bearing assembly and to enable assembling the races in said partially telescoping relation, and a member engaging each race having means to urge the races axially together.

References Cited in the file of this patent

UNITED STATES PATENTS

| | | |
|---|---|---|
| 2,764,565 | Hoppe | Sept. 25, 1956 |
| 2,805,107 | Van De Warker et al. | Sept. 3, 1957 |
| 2,809,130 | Rappaport | Oct. 8, 1957 |
| 2,828,236 | West | May 25, 1958 |
| 2,928,701 | Ferdig | Mar. 15, 1960 |
| 2,951,053 | Gottfried | Aug. 30, 1960 |
| 2,984,963 | Reuter | May 23, 1961 |
| 2,986,432 | Schlauch | May 30, 1961 |